Aug. 7, 1923.  
I. FAUNCE  
1,464,172  
SAW SET AND CLAMP  
Filed Oct. 12, 1922
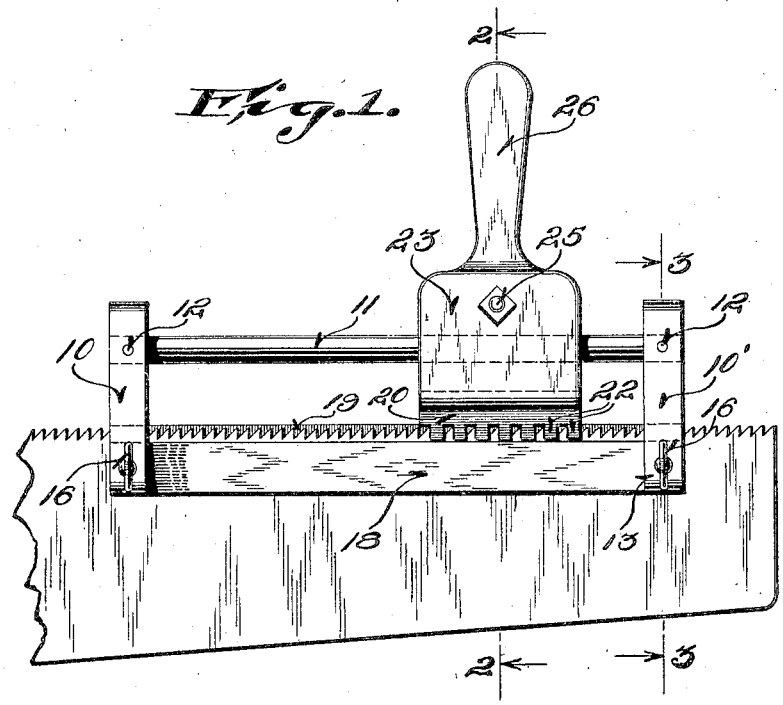
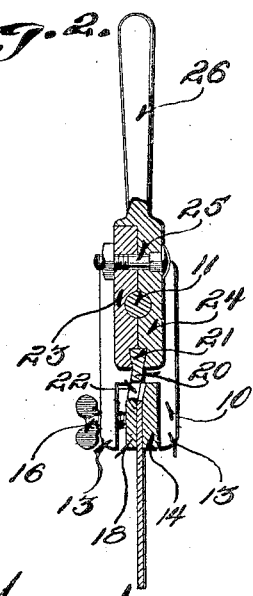
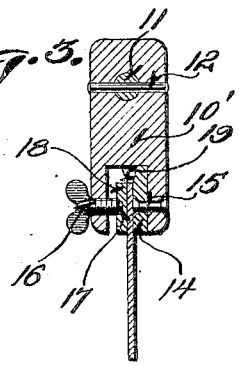

Patented Aug. 7, 1923.

1,464,172

UNITED STATES PATENT OFFICE.

IRA FAUNCE, OF RACINE, WISCONSIN.

SAW SET AND CLAMP.

Application filed October 12, 1922. Serial No. 594,032.

*To all whom it may concern:*

Be it known that I, IRA FAUNCE, a citizen of the United States, and resident of Racine, in the county of Racine and State of Wisconsin, have invented certain new and useful Improvements in Saw Sets and Clamps; and I do hereby declare that the following is a full, clear, and exact description thereof.

The invention relates to a saw set and a clamp attachment adapted to be secured to a saw.

It comprises a set having a number of depending fingers and means for supporting the fingers adjacent alternate teeth of a saw, so that its action is not limited to a small number of teeth, but may be extended to take in all of the teeth on the saw, a particular number being acted on at one time.

Heretofore the setting of teeth of a saw has been attained with considerable difficulty, by reason of the fact that each tooth has been handled separately. The operation has therefore been lengthy, and the set of the teeth has not been perfectly uniform.

It is the object of the invention to provide means for setting a plurality of teeth at once. The fingers on the set are brought in contact with alternate teeth, and they are pressed into the desired set. The operation is performed very quickly and without difficulty, the limit of deflection of the teeth being determined by a set bar. The set of all teeth is substantially uniform.

An object of the invention is the provision of a clamp by which the device may be conveniently and securely affixed to a saw in operative position. The clamp may be used on saws of various sizes and types.

With the above and other objects in view which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, is illustrated one complete example of the physical embodiment of the present invention constructed according to the best mode so far devised for the practical application of the principles thereof.

Figure 1 is a side elevation of the device as affixed to a saw.

Figures 2 and 3 are sections on the line 2—2 and 3—3 of Figure 1 respectively.

A pair of similar end blocks 10—10' are provided, having aligned openings for the reception of a guide rod 11 which is secured by means of pins 12. Each of the blocks is provided with spaced legs 13—13'. A set bar 14 is secured at its ends to legs 13' by means of rivets 15. Legs 13 are provided with a threaded opening for the reception of winged screws 16, having reduced ends 17 received in openings in clamp bar 18. The clamp bar and the set bar have co-extensive flat surfaces adapted to grip the surface of the saw adjacent the teeth. Center bar 14 is provided further with an inclined surface 19, against which the teeth of the saw may be deflected for giving them the desired set. By means of the winged screws, the clamping device may be secured conveniently to any part of the saw. It may also be loosened and shifted along the saw so that additional teeth thereon may be acted upon. For deflecting the teeth, a set 20 is provided, having a dove-tail portion 21, and a plurality of spaced fingers 22, adapted to be brought in contact with the alternate teeth of the saw for deflecting them against bar 14 to impart the desired set. The surface of the teeth has the same inclination as surface 19 of bar 14, so that the teeth are forced into close contact with the setting surface of the bar.

A pair of plates 23 and 24 are provided having substantially similar recesses on their inner faces for the reception of dove-tail 21. The plates are provided also with mating semi-cylindrical grooves adapted to fit upon rod 11. A bolt 25 is received in openings in the plate and clamps them securely together so that set 20 is retained securely in position.

Formed on the upper end of plate 24, is a handle 26, the lower part of which overlies the adjacent upper surface of plate 23. By merely rotating the handle, fingers 22 are brought in contact with alternate teeth of the saw, urging them against set bar 14. By this rapid and conveniently effective operation, a plurality of teeth may be acted on simultaneously. After these teeth have been given a proper set, the handle is moved laterally, the plates 23 and 24 being slid on guide 11. Teeth 22 are then brought into operation on a succeeding series of alternate teeth. The winged screws 16 may be readily released, and bar 14 may then be positioned on the other surface of the saw. In this way, all of the teeth on the saw may be acted on and given a uniform set. Plates 23 and 24 and bolt 25 may be conveniently released so that an additional set may be substituted. Thus the device may be used to act on saws of different types.

It is apparent, therefore, that a device has been provided of great simplicity, composed of a minimum number of parts, and inexpensive to manufacture.

If desired, the saw may be positioned in a vice, in which case the set may be used without the novel clamp.

Claims:

1. The combination of a set having spaced fingers, a pair of plates having recesses therein for the reception of said set, said plates having grooves therein, means for securing said plates together, a guide rod in said grooves, said plates being slidable on said guide rod, a handle on one of said plates, and means for securing said guide rod to a saw.

2. The combination of a set bar having a face adapted to lie along the face of a saw, and an inclined face at an angle to said first mentioned face, a clamping bar, means for holding said bars against opposite faces of a saw, a set having spaced fingers, and manually operable means for urging said fingers against alternate teeth of a saw for compressing said teeth against said inclined surface.

3. The combination of a guide rod, means for clamping said guide rod on a saw, a set having a plurality of spaced fingers, and manually operable means slidably positioned on said rod for bringing said fingers in contact with alternate teeth of said saw.

In testimony that I claim the foregoing I have hereunto set my hand at Racine, in the county of Racine and State of Wisconsin.

IRA FAUNCE.